March 5, 1946. T. B. HALL 2,396,006
COLLET CHUCK
Filed July 13, 1943 2 Sheets-Sheet 1

Fig. 3ª

INVENTOR.
T. B. HALL
BY
William E. Hall
ATTORNEY.

March 5, 1946.                    T. B. HALL                    2,396,006
                                COLLET CHUCK
                          Filed July 13, 1943                2 Sheets-Sheet 2
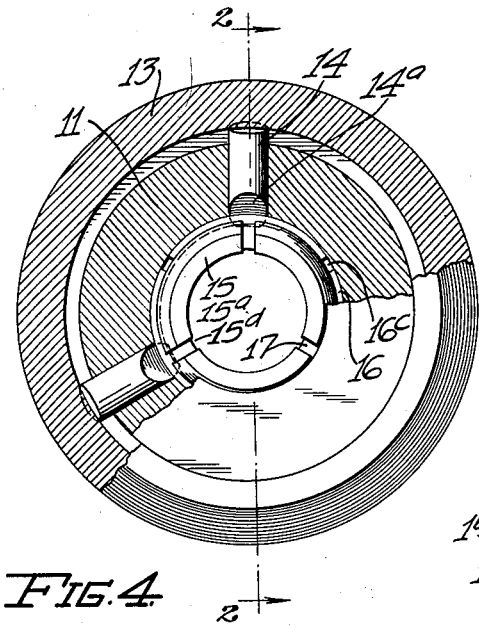
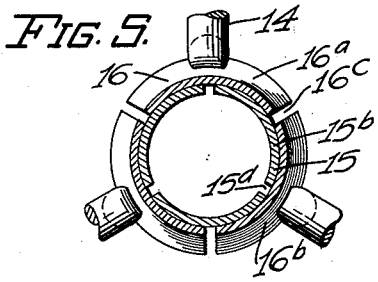
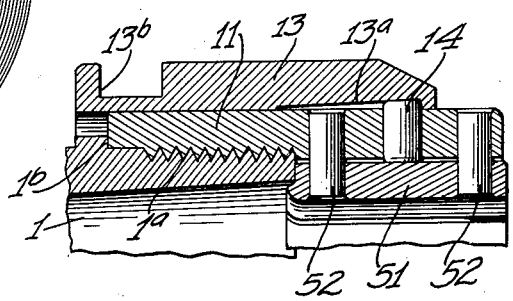
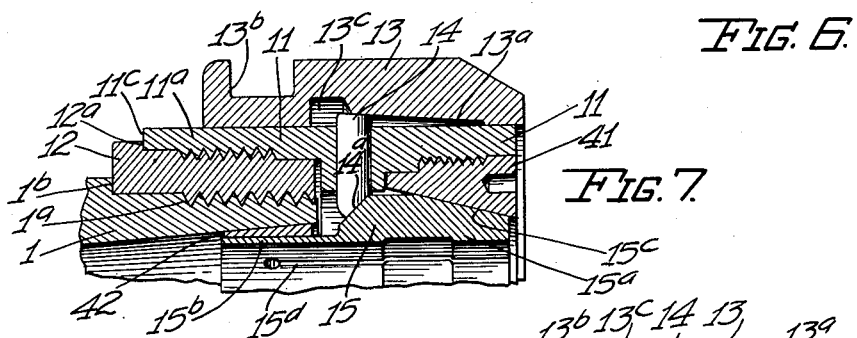
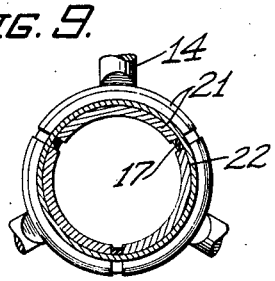
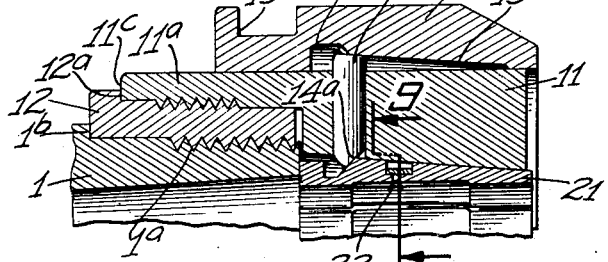
INVENTOR.
T. B. HALL
BY
William B. Hall
ATTORNEY.

Patented Mar. 5, 1946

2,396,006

UNITED STATES PATENT OFFICE 2,396,006

COLLET CHUCK

Teller B. Hall, Los Angeles, Calif.

Application July 13, 1943, Serial No. 494,474

7 Claims. (Cl. 279—51)

My invention relates to a collet chuck, and more particularly to that class known in the art as "nose-type" collet chucks.

One of the principal objects of my invention is to provide a collet chuck which is particularly simple and economical to manufacture, simple to operate, and one which will not readily deteriorate or get out of order.

An important object of this invention is to provide a chuck of this class whereby the material or stock to be held, or worked upon, may be tightly gripped with a minimum of effort on the part of the operator, and in which such gripping effect is produced by a very slight, inclined, or tapered, wedge action, and which at the same time serves substantially to lock the material or stock in the chuck without any auxiliary means to lock the chuck in the clamping or gripping condition.

An object also of this invention is to provide simple lever means for shifting or operating the collet chuck whereby the material or stock may be very tightly gripped, and also easily and quickly released, with only slight effort on the part of the operator.

Another important object of this invention is to provide a novel combination of inclined, wedge, or tapered surfaces for compounding the action from the manually operated means to the material or stock gripping means, for tightly gripping such material or stock with a minimum of force by the manual operating means.

A further object of this invention is the provision of jaw gripping means which is diametrically contracted by tapered or cone surfaces forced into engagement with each other by operating members, which are forced radially inwardly, and which in turn force contraction of the jaw means by other inclined surfaces.

A further important object of this invention is to provide a collet chuck in which the collet or jaw means may be readily replaced by others of different sizes, or in which slight variation in the size of the material or stock to be held may be readily compensated for by the addition or replacement of simple shim washers.

Still another object of this invention is to provide simple means of expanding or opening the jaws of a jaw means or the jaw portions thereof.

A novel feature of this invention is the provision of simple means of holding separate jaws together as a unit.

A still further object of this invention is to provide simple means of closing the longitudinal slots, provided in the collet, which form the separate jaw portions, thereby preventing foreign material from entering the operating mechanism of the chuck.

An important object also of this invention is the provision of a novel adaptor whereby a device of this class may be accurately fitted to the headstock spindle of a lathe, or the like.

With these and other objects in view, as will appear hereinafter, I have devised a collet chuck having certain novel features of construction, combination, and arrangement of parts and portions, as will be hereinafter described in detail and particularly set forth in the appended claims, reference being had to the accompanying drawings, and to the characters of reference thereon, which form a part of this application, in which:

Figures 1, 2, 3:
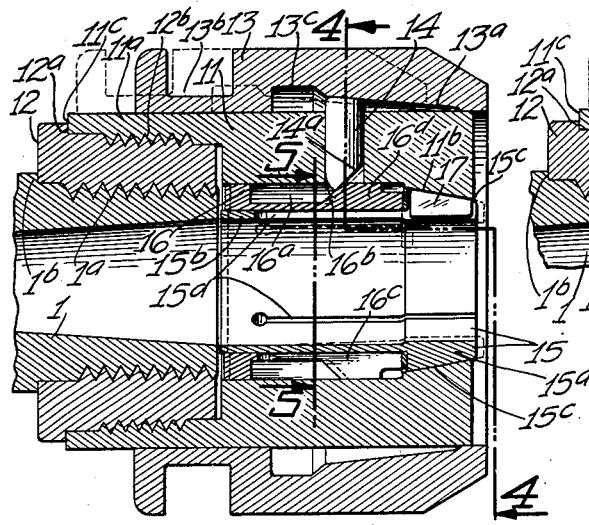
Fig. 1 is a fragmentary side elevation of the headstock of a lathe showing my collet chuck in one form mounted thereon, and showing by dotted lines various shifted positions of certain shiftable members thereof, and also showing fragmentarily the material or stock held thereby.
Fig. 2 is a longitudinal sectional view thereof, in an open position, and showing by dotted lines various parts shifted to their closed or stock-holding positions, the view being taken through 2—2 of Fig. 4.
Fig. 3 is a similar fragmentary sectional view thereof, but showing by solid lines the chuck in a closed or stock-holding position, and by dotted lines various parts shifted to open positions.

Fig. 3ª is a fragmentary longitudinal section of a preferred form of the adaptor sleeve;

Fig. 4 is a fragmentary transverse view, partly in section, taken at 4—4 of Fig. 2;

Fig. 5 is a fragmentary sectional view thereof taken through 5—5 of Fig. 2;

Fig. 6 is a fragmentary longitudinal section, similar to that shown in Fig. 3, but in an open position, of a slightly modified form of construction;

Fig. 7 is a similar fragmentary longitudinal section thereof of another slightly modified form of construction, and showing primarily the addition of a part to facilitate dismantling of the collet chuck shown in Figs. 2 and 3, for replacing the collet or associated parts;

Fig. 8 is another fragmentary longitudinal section view of still another modified form of construction, showing a means employed for holding together separate jaws of the jaw means; and, Fig. 9 is a fragmentary transverse section taken through 9—9 of Fig. 8.

The drive spindle 1, upon which my collet chuck is designed to be mounted, is shown here as the headstock spindle of a lathe, and is shown as mounted in the usual support or housing 2 of the headstock of the lathe.

All of the collet chucks shown in the drawings, have a collet chuck body 11 which is hollow and is provided at one end with an internally threaded portion 11ᵃ which is adapted to be carried by the threaded end of the lathe spindle 1. As shown in the drawings, this threaded portion of the body is fitted to the threaded end of the spindle by means of an adaptor 12, as will be hereinafter more specifically described.

Within the body is mounted the jaw means which is operated or contracted by an operating sleeve 13, through the medium of operating members 14. The sleeve 13 is slidably fitted around the body 11.

The jaw means, is shown in Figs. 2 and 3, as comprising a collet 15 having at its outer end a plurality of diametrically contractable jaw portions 15ᵃ, and having, at its inner end, a thin cylindrical portion 15ᵇ, which extends into a split cylindrical operating guide 16. The jaw portions are formed by splitting the outer end of the collet. The operating guide is provided intermediate its ends with an annular channel 16ᵃ for receiving the inner ends of the operating members 14. These operating members are hardened pins which are arranged in a plane perpendicular to the axis of the collet chuck and radiate from its axis. The pins are forced inwardly by a slightly inclined or slightly tapered cone surface 13ᵃ at the outer end of the interior of the sleeve 13. Experience has shown that the inclination of the operating surface may be as low as 1° to obtain tight clamping action of the stock to be held by the chuck, but in order to obtain efficient clamping action commensurate with less shifting of a sleeve 13, this inclination may be approximately 3°. As the sleeve 13 is shifted inwardly, the inclined operating surface 13ᵃ engages the outer ends of the operating members or pins 14, driving the same inwardly with great force. The inner ends of the pins 14 are bevelled at 14ᵃ in such a manner that as the pins are driven inwardly into the channel 16ᵃ, the bevelled ends thereof engage bevelled ledges 16ᵇ at the outer side of the channel 16ᵃ and force the operating guide 16 longitudinally outwardly, carrying with it the collet 15.

The outer end of the bore of the body 11 is also provided with an inclined, tapered, or cone surface 11ᵇ, which is adapted to be engaged by a conformingly inclined surface 15ᶜ at the outer sides of the jaw portions 15ᵃ of the collet. Thus, the jaw portions of the collet are contracted diametrically as the collet is forced outwardly by the operating pins 14 and the guide 13. Experience has also shown that the inclination of the jaw portions and the outer end of the bore of the body 11 may be as low as 8°, but in order to obtain quickest results with the least shifting of the sleeve 13, the angle may be approximately 12°.

The operating guide is constructed similarly to the collet, that is, it is split longitudinally at its outer end, as indicated by 16ᶜ in Figs. 2 and 5, providing contractable portions 16ᵈ. As the operating pins 14 engage the bevelled ledges, they not only tend to force the guide outwardly, but also aid in directly contracting the intermediate portion of the guide, and therefore the intermediate portion of the collet.

Such combination of contracting forces upon the collet, namely, at the outer end and intermediate portion thereof, causes the jaws of the collet to contract in a direction to assume positions parallel to the axis of the collet, resulting in less mutilation of the stock or other object held by the collet and also causing tighter gripping of such stock or other object.

The above construction gives a compounding wedge action between the sleeve 13 and the collet 15 for not only tightly clamping or gripping the stock, but for locking the same in the clamping position.

At the inner end of the cone shaped operating surface 13ᵃ, I have provided a clearance recess or channel 13ᶜ into which the outer ends of the pins or operating members are adapted to be received so as to allow the inner ends of the pins to be retracted into the body in order to permit the withdrawal of the collet 15 and guide 16.

The jaw portions 15ᵃ of the collet may be separated by rubber strips 17, as shown best in Fig. 4.

Collets are usually made by providing longitudinal slots inwardly from the outer end of the collet, as indicated by 15ᵇ, and in the outer ends of these the rubber strips are located. Foreign particles, such as chips, find their way into the interior of the collet chuck through the slots, preventing proper functioning of the chuck and also damaging the same. In order to minimize this result, the slotted contractible portion of the guide is tightly but slidably fitted around the slotted cylindrical portion of the collet backwardly from the jaw portions of the collet, with the slots of the guide staggered with respect to the slots of the collet. Thus the slots of the latter are closed backwardly from the resilient spacer or rubber strip filled portions of the slots opposite the jaw portions, and thereby preventing inward passage of such foreign particles.

It is often desirable to use separate jaw members instead of a collet, as shown in Fig. 8 of the drawings. In such instances, segmental jaw members 21 are provided and circumferentially arranged within the body. These separate jaw members may be held together by a continuous ring 22 located in a channel between the ends of the jaw members. In this instance, there is also provided resilient strips 17 between the adjacent edges of the jaw members.

In Fig. 2 of the drawings, the head-stock spindle of the lathe is shown as threaded at one end 1ᵃ and is provided with a shoulder 1ᵇ at the inner end of the threaded portion. The adaptor sleeve 12, referred to above, is screwed over this threaded portion with its inner end against the shoulder 1ᵇ. The threaded end 11ᵃ of the body 11 is screwed over an externally threaded portion of the adaptor sleeve with the inner end 11ᶜ of the body engaging a shoulder 12ᵃ at the inner end of the sleeve. The threads in the body are preferably smaller than those on the headstock spindle in order to provide a tighter fit of the sleeve in the chuck.

In order to facilitate the fitting of a chuck to the machine spindle of the purchaser or user of a new chuck, the adaptor sleeve 12 may be sold in a rough condition shown fragmentarily in Fig. 3ᵃ. The adaptor sleeve may be screwed on the spindle and machined in place to receive the new chuck. The rough adaptor sleeve has exterior threads 12ᵇ which fit the interior threads at the inner end of the body. These engaging threads form what may be termed a "sloppy" fit. The adaptor sleeve has portions 12ᶜ and 12ᵈ at respectively the inner and outer ends thereof which are intended to be machined or turned off, while the adaptor is in place on the machine spindle, to form a tight or slip fit with corresponding portions on the body 11.

In Fig. 1 of the drawings, the headstock spindle support or housing 2 supports a bracket 31, and the outer end of the bracket is provided with a recess 31ᵃ which is positioned below and near an annular channel 13ᵇ, at the inner end of the shifting sleeve 13. The sleeve 13 is shifted by means of an operating lever 32 which has a loop portion 32ᵃ which straddles or fits around the sleeve 13. This loop portion carries pivoted shoes 33 which extend into the channel 13ᵇ. The lower end of the lever has a projection 32ᵇ which extends into the recess 31ᵃ. The outer side and lower end of the projection is curved, as indicated by 32ᶜ. This curvature permits the insertion of the projection into the recess 31ᵃ even though the bracket is located close to the sleeve 13. It also provides the shortest possible lever between the center of the shoes and the fulcrum provided by the bracket 31. Around the projection 32ᵇ is provided a rubber washer 34 in order yieldably to space the lower end of the lever 32 above the bracket. The lower end of the lever, immediately above the projection 32ᵇ is substantially square, as indicated by 32ᵈ, so as to raise the lever slightly above its pivot bracket when the lever is shifted to either side of the vertical position. Such construction will permit the pivotal axis of the shoes to be shifted in a substantially straight line along the axis of the chuck at all times.

In Fig. 7 of the drawings, I have provided a threaded collar 41 in the outer end of the body 11, so as to permit ready removal of the collet or jaw members from the chuck without the necessity of removing the other elements thereof.

In Fig. 6 of the drawings, I have shown a slightly modified form of my chuck in which the jaw members, designated 51, are provided with guide pins 52 at their outer and inner ends, and the radially outer end of the guide pins shiftably support the jaws in the body 11. The jaws 51 are forced inwardly by operating members 14, as described above, these pins are forced inwardly by a sleeve 13, also as described above.

The portion of the apparatus described especially with reference to Figs. 2 and 3 may be considered as including a jaw means comprised of a collet 17 and the sleeve 16. This jaw means may be, and is defined in the claims as, operated by means of the pins 14 which radiate through the body. The pins or equivalent operating members for transmitting force from the operating surface 13ᵃ of the operating sleeve to the jaws may be considered as a portion of the jaw means.

Each of the species shown in the drawings and described in the specification include a jaw means that embodies such an operating member. Each of these species includes a hollow body 11, a sleeve 13, and a jaw means of the type just mentioned.

In the species described with reference to Figs. 2 and 3, the pins 14 and the guide 16 comprise means for transforming force, from an operating surface of the operating sleeve 13 through the openings in the body 11 and against the shoulder of the collet 17, for moving the collet forwardly against the inclined surface 11ᵇ of the walls of the openings in which the pins are slidably engaged in the body, providing bearing surfaces for such pins securely to hold the pins for taking the backward reaction resultant from the forward force when applied to the shoulder 16ᵇ of the guide 16 for moving said collet forwardly with respect to the body.

The inner surface 13ᵃ of the sleeve 13 is an annular inclined surface. It is preferably in the shape of a surface of revolution coaxial with respect to the body 11, also with respect to the spindle of the lathe. It is preferably such that a tracing thereof in a plane through the axis of the sleeve is inclined with respect to said axis at an angle slightly less than the angle of friction for the inner surface of the sleeve and the outer end surfaces of the pins. Said tracing may depart from a straight line and can be somewhat curved; however, it is preferable that the inclination of the portion of the tracing at the point where the sleeve is brought into frictional engagement with the end of the pin is at the angle substantially hereinbefore mentioned, when the chuck is in stock gripping position.

It is to be understood that the use of mathematical specification of the shape of the inner operative surface 13ᵃ of the sleeve, where used in the claims, is to be construed as meaning a surface substantially of that shape and the type adapted for use in forcing and positioning the pins inwardly sufficiently for opening and closing the jaw means sufficient for use in gripping and releasing stock having normal or reasonable variation in stock sizes, and at the same time adapted to develop sufficient friction to cause the chuck to stay locked while gripping stock.

Though I have shown and described a particular construction, combination, and arrangement of parts and portions, and certain modifications thereof, I do not wish to be limited to the same, but desire to include in the scope of my invention the construction, combination, and arrangement substantially as set forth in the appended claims.

I claim:

1. In a chuck, the combination with a support, of a chuck mounted thereon, said chuck having a longitudinally slidable sleeve mounted therearound for operating the chuck, the sleeve having an annular channel, a sleeve shift lever straddling the sleeve and provided at its opposite sides with shoes adapted to ride in the channel, a pivot bracket mounted on the spindle support and provided with a pivot recess, the lever having a pivot portion extending into said recess, the portion of the lever at the inner end of the projection and adapted to rest with respect to the bracket being substantially flat and lying in a plane substantially perpendicular to the longitudinal axis of the lever.

2. A collet chuck, comprising a hollow body, an operating guide mounted coaxially within the body, and slidable with respect thereto, a collet having a cylindrical shank mounted within the guide, the collet being split at the outer end, forming jaw portions, the outer portions of the body and the collet having conforming and interengaging inclined surfaces for contracting the jaw portion when the guide is moved outwardly with the collet, and operating pins radially arranged with respect to the body, and provided at their inner ends with bevelled portions conforming with and engaging correspondingly inclined surface means of the guide, the latter inclined surface means being positioned inwardly from the inclined surface of the collet, the bevelled portions of the operating pins, when forced radially inwardly, being capable of forcing the collet into engagement with the inclined surface of the body.

3. A collet chuck, comprising a supporting body, a sleeve mounted over the body and slidable longitudinally with respect thereto, an operating member radiating through the body, the interior of the sleeve having operating surface means inclined at an angle to its axis, said surface means being adapted slidably to engage the outer portion of said operating member, and jaw means circumferentially arranged within the body and adapted to be operatively connected to the inner portion of said operating member, and to be diametrically contracted when the operating member is forced radially inwardly with the longitudinal movement of the sleeve, the sleeve having an enlarged recess at the inner end of said surface means positioned most remote from said axis, said recess being capable of receiving the outer end of the operating member when retracting the same within the body and outwardly with respect to the axis, to facilitate the withdrawal of the jaw means from the body.

4. A collet chuck, comprising a hollow body, an operating guide mounted coaxially within the body and slidable with respect thereto, a collet having a cylindrical shank mounted within the guide, the collet being slit at the outer end, forming jaw portions, the outer end of the guide being also slit, the slit portions of the guide being circumferentially staggered with respect to the slit portions of the collet, the outer end portion of the body having means for contracting the jaw portions when the guide is moved outwardly with the collet, and means for forcing the guide outwardly.

5. A collet chuck, comprising a hollow body, a cylindrical operating guide mounted coaxially within the body and slidable with respect thereto, a cylindrical collet slidably mounted within the guide, the guide having an exterior annular channel with one end wall diverging outwardly forming an inclined face, a plurality of pins radiating outwardly from the inclined face of the guide and provided at their inner ends with inclined faces adapted to engage the inclined face of the guide, and means at the outside of the body for forcing said pins inwardly, the radially inner cylindrical wall of the channel of the guide being positioned radially inwardly from the inner ends of the pins, the outer end portions of the body and the collet having conforming and interengaging inclined surfaces for contracting the jaw portions when the guide is moved longitudinally with the collet by the inward shifting of the pins.

6. A collet chuck, comprising a hollow body, a cylindrical operating guide mounted coaxially within the body and slidable with respect thereto, a cylindrical collet slidably mounted within the guide, the guide having an exterior annular channel with one end wall diverging outwardly forming an inclined face, a plurality of pins radiating outwardly from the inclined face of the guide and provided at their ends with inclined faces adapted to engage the inclined face of the guide, a sleeve slidably mounted around the body and provided with an inner cone surface means adapted to engage correspondingly shaped outer ends of the pins, the inclination of the cone surface of said means being such that the engagement thereof with the outer ends of the pins causes sufficient friction to lock the collet in contracted condition.

7. A collet chuck, comprising a supporting body, jaws arranged within the body for gripping stock to be machined, a plurality of pins radially arranged and slidably mounted in form-fitting holes in the body, a sleeve slidably mounted around the body and provided with an inner cone surface means adapted to engage correspondingly shaped outer ends of the pins, the inner ends of the pins being operatively connected with the jaw means in such a manner that shifting of the sleeve causes the pins to be forced inwardly for closing the jaw means on the stock, the inclination of the cone surface of said means being such that the engagement thereof with the outer ends of the pins causes sufficient friction to lock the jaw means in a closed position around the stock.

TELLER B. HALL.